(12) United States Patent
Crolley (10) Patent No.: US 7,853,671 B2
(45) Date of Patent: Dec. 14, 2010

(54) SYSTEM AND METHOD FOR PERFORMING A COMPREHENSIVE COMPARISON OF SYSTEM DESIGNS

(75) Inventor: Carrol Wayne Crolley, Bryant, AR (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1171 days.

(21) Appl. No.: 11/495,762

(22) Filed: Jul. 31, 2006

(65) Prior Publication Data

US 2008/0040456 A1 Feb. 14, 2008

(51) Int. Cl.
*G06F 15/177* (2006.01)
*G06F 15/173* (2006.01)
(52) U.S. Cl. ...................... 709/220; 709/226
(58) Field of Classification Search .......... 709/220, 709/226
See application file for complete search history.

(56) References Cited

U.S. PATENT DOCUMENTS

| | | | |
|---|---|---|---|
| 5,821,937 A * | 10/1998 | Tonelli et al. ............... 715/853 |
| 6,047,041 A | 4/2000 | Ellinger | |
| 6,229,540 B1 * | 5/2001 | Tonelli et al. ............... 715/735 |
| 6,917,816 B2 * | 7/2005 | Abed et al. ............... 455/556.1 |
| 6,922,682 B1 | 7/2005 | Shum et al. | |
| 6,983,236 B1 | 1/2006 | Karlovac et al. | |
| 7,502,839 B2 * | 3/2009 | O'Sullivan et al. .......... 709/220 |
| 7,610,361 B2 * | 10/2009 | Manthoulis et al. ......... 709/220 |
| 2001/0034591 A1 * | 10/2001 | Kawas et al. ................... 703/13 |
| 2003/0158765 A1 * | 8/2003 | Ngi et al. ........................ 705/7 |
| 2003/0181210 A1 * | 9/2003 | Shipman ..................... 455/446 |
| 2004/0010577 A1 * | 1/2004 | Yegenoglu .................. 709/223 |
| 2004/0068512 A1 | 4/2004 | Liu et al. | |
| 2004/0083277 A1 * | 4/2004 | Chaporkar et al. .......... 709/220 |
| 2004/0095887 A1 * | 5/2004 | Klincewicz et al. ......... 370/237 |
| 2004/0133663 A1 * | 7/2004 | Grover et al. ............... 709/220 |
| 2005/0188059 A1 * | 8/2005 | Manthoulis et al. ......... 709/220 |
| 2005/0209897 A1 | 9/2005 | Luhr | |

* cited by examiner

*Primary Examiner*—Patrice L Winder
*Assistant Examiner*—Minh-Chau Nguyen
(74) *Attorney, Agent, or Firm*—Greenblum & Bernstein, P.L.C.

(57) ABSTRACT

A system for analyzing multiple network system designs includes a database and a processor. The database stores a multiple components in association with data indicating a type of component, a component provider and at least one component characteristic. The processor receives a first design that includes a first component of the multiple components, identifies the first component, and accesses the database to select a second component comparable to the first component based on at least one of the component type and the component provider of the second component, and a specific characteristic of the second component corresponding to a specific characteristic of the first component. The processor indicates at least one difference between the first component and the second component.

13 Claims, 5 Drawing Sheets

|  | Yates Model 8872u | WalHat Model 909 | Sugg Model 909 | Miller Model 1191 |
|---|---|---|---|---|
| Port density | 24 | 24 | 24 | 12 |
| Backplane Speed | 33 | 34 | 22 | 87 |
| Power consumption | 25 | 25 | 25 | 25 |
| Stackable | Yes | No | No | Yes |
| Color | Blue | Green | Yellow | Gray |

| Characteristic | Network A | Network B |
|---|---|---|
| Total Switch Port Density | 76 | 76 |
| Price per port | $131 | $176 |
| Network Hops | 2 | 3 |
| Aggregate MTBF | 107 days | 131 days |
| Number of manufacturer's Technical Bulletins for all models in this design to date | 23 | 97 |
| Number to support tickets for all components in this design to date | 12 | 53 |
| Total number of technical training courses recommended by manufacturer for all components | 3 | 17 |

510

| Component | Network A Mean Score | Network B Mean Score |
|---|---|---|
| Switches | 3.7 | 2.9 |
| Routers | 3.7 | 3.9 |
| Wireless Access Points | 1.2 | 2.1 |
| Aggregate | 8.6 | 8.9 |

520

| Component | Characteristic | Component | Characteristic |
|---|---|---|---|
| Model 2211 | Backplane Speed= 99 | Model 989 | Backplane Speed= 102 |
| Model 2211 | Power Consumption= 120w | Model 989 | Power Consumption= 89W |
| Model 2211 | Operating Environmentals =33 degrees | Model 989 | Operating Environmentals =38 degrees |

SYSTEM AND METHOD FOR PERFORMING A COMPREHENSIVE COMPARISON OF SYSTEM DESIGNS

BACKGROUND

1. Field of the Disclosure

The present disclosure relates to the field of engineering design and analysis, and more particularly, to compare design parameters and capabilities among various proposed designs.

2. Background Information

Engineers and designers are often called upon to design and/or implement systems using combinations of existing technologies, varieties of which may be provided by various equipment manufacturers and/or vendors. Also, these systems may be compared to alternative systems designed by competitors attempting to secure contracts with potential customers. For example, network system engineers developing data network, video and voice designs for customers may perform a comparative analysis using various equipment manufacturers. Accordingly, the engineer may recreate parallel designs "from the ground up" using different manufacturer's components. Even then, the results obtained by the engineer are subjective with respect to comparing and contrasting the multiple designs, for example, based on the personal experience and knowledge of individual components. Further, the designs are not effectively analyzed as a whole in that the various features and functionalities of competing designs may not be evaluated on a solution level.

Accordingly, there is a need for efficient, objective and comprehensive comparison of possible engineering designs, for both element-by-element comparisons and holistic analyses.

BRIEF DESCRIPTION OF THE DRAWINGS

The present disclosure provides the detailed description that follows by reference to the noted drawings by way of non-limiting examples, in which like reference numerals represent similar parts throughout several views of the drawings, and in which.

DETAILED DESCRIPTION

The present disclosure relates to providing a tool with which an engineer or architect can design a solution, such as a communications network design, using various components (e.g., switches, routers, multiplexers, servers, access points, etc.) from one manufacturer, and then automatically populate effectively the same design with comparable components from another manufacturer. The engineer may then compare and contrast the various features and viability of each design, either to help determine which manufacturers' components will be included in the engineer's design or to anticipate strengths and weaknesses of a competitor's proposed design. An additional function enables the user to generate a report to facilitate comparing and contrasting the two designs based on different manufacturers' platforms. The report may also be used to evaluate which manufacturer could be selected, based on the design considerations specific to a particular design need, and selection of the most appropriate vendor could be made.

In view of the foregoing, the present disclosure, through one or more of its various aspects, embodiments and/or specific features or sub-components, is thus intended to bring out one or more of the advantages as specifically noted below.

An aspect of the present disclosure provides a computer readable medium that stores a computer program for analyzing network system designs, including a first receiving code segment, an identifying code segment, a second receiving code segment and a comparing code segment. The first receiving code segment is for receiving a first design including multiple first components, each of which has at least one characteristic. The identifying code segment is for accessing a component database and identifying multiple second components corresponding to the first components based on at least one characteristic comparable to the at least one characteristic of the corresponding one of the first components. The second receiving code segment is for receiving a second design including the second components. The comparing code segment is for comparing at least one feature of the first design with at least one feature of the second design corresponding to the at least one feature of the first design to identify at least one difference between the first design and the second design. The computer readable medium may further include a reporting code segment for generating a report showing the comparison of the at least one feature of the first design and the corresponding at least one feature of the second design, as well as the at least one difference between the first design and the second design. A selection of the first design or the second design for implementation may be based on the at least one difference between the first design and the second design. The comparing code segment may include a scoring code segment that assigns a first score to the at least one feature of the first design and a second score to the corresponding at least one feature of the second design.

The first components may be associated with a first vendor and the second components may be associated with a second vendor. Also, the first components may include at least one of a switch, a router and a network access point from the first vendor and the second components may include at least one of a switch, a router and a network access point from the second vendor. The identifying code segment may identify the second components based on matching the at least one characteristic of each of the first components with the at least one characteristic of the corresponding one of the second components.

Further, the comparison of the at least one feature of the first design with the corresponding at least one feature of the second design may include comparing a port density, a price per port and/or a number of network hops. The comparison may include comparing at least one of a mean time between failures, an historical number of technical bulletins, an historical number of support tickets and a number of recommended training courses with respect to each of the first components and each of the corresponding second components.

Another aspect of the present disclosure provides a computer readable medium that stores a computer program for analyzing multiple network system designs. The computer readable medium includes a first receiving code segment for receiving a first design including a first component having first attributes; an identifying code segment for identifying a second component from a component database corresponding to the first component based on a type of the first component or the first attributes of the first component, the second component having second attributes; and a comparing code segment for comparing the first attributes with the second attributes to identify at least one difference between the first component and the second component. The type of the first design component may include one of a switch, a router and a network access point.

The computer readable medium may further include a second receiving code segment for receiving a second design including the second component. The comparing code segment may then compare at least one feature of the first design with at least one feature of the second design corresponding to the at least one feature of the first design to identify at least one difference between the first design and the second design. A selection of the first design or the second design for implementation may be based on the at least one difference between the first design and the second design, or the at least one difference between the first component and the second component. The computer readable medium may further include a reporting code segment for generating a report showing the comparison of the first attributes with the second attributes, and the at least one difference between the first attributes and the second attributes.

Yet another aspect of the present disclosure provides a system for analyzing and selecting a network system design, including a database and a processor. The database includes multiple components, each of which is stored in association with data indicating a component type, a component provider and at least one component characteristic. The processor receives a first design including a first component of the multiple components, identifies the first component, and accesses the database to select a second component comparable to the first component based on at least one of the component type of the second component, the component provider of the second component, and a specific characteristic of the second component corresponding to a specific characteristic of the first component. The processor provides an indication of at least one difference between the first component and the second component. The processor may also be configured to determine a first score for the at least one characteristic of the first component and a second score for the at least one characteristic of the second component, indicating which of the first component and the second component is preferable with respect to the corresponding at least one characteristic. The preferable one of the first component and the second component is selected for the network system design.

The processor may also be configured to receive a second design including the second component and to identify at least one feature of the first design and a corresponding at least one feature of the second design. The processor then may indicate at least one difference between the at least one feature of first design and the at least one feature of the second design. Also, the processor may be accessible to multiple clients over a data network, and receive the first design from one of the clients. The processor may be configured to receive identification of the specific characteristic of the second component and the corresponding specific characteristic of the first component from the one of the clients.

The various aspects and embodiments of the present disclosure are described in detail below.

Figure 1:
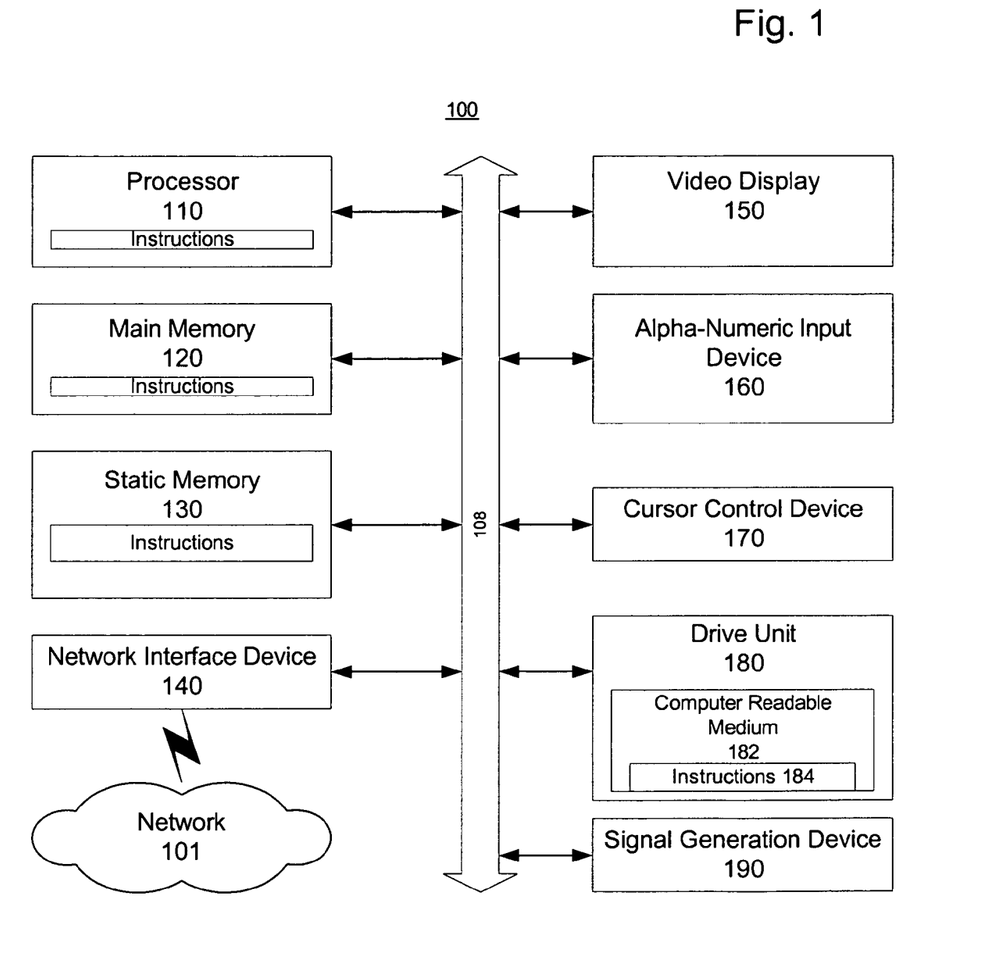
FIG. 1 shows an exemplary general computer system that includes a set of instructions for performing processing, according to an aspect of the present disclosure.

Referring to FIG. 1, a description is now provided of an illustrative embodiment of a general computer system 100, on which the design comparative analysis process or application can be implemented. The computer system 100 can include a set of instructions that can be executed to cause the computer system 100 to perform any one or more of the methods or computer based functions disclosed herein. The computer system 100 may operate as a standalone device or may be connected, e.g., using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, e.g., a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g., software, can be embedded. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Using a general computer system as shown in FIG. 1, a process for comparing and analyzing designs and/or various features and components of the designs may be provided. The system of FIG. 1 can also operate as various elements within a network. For example, a program implementing the disclosure may be loaded and executed on one or more web servers. Alternatively, the program may be run locally on a PC or a server dedicated to a particular user group or region.

Figure 2:
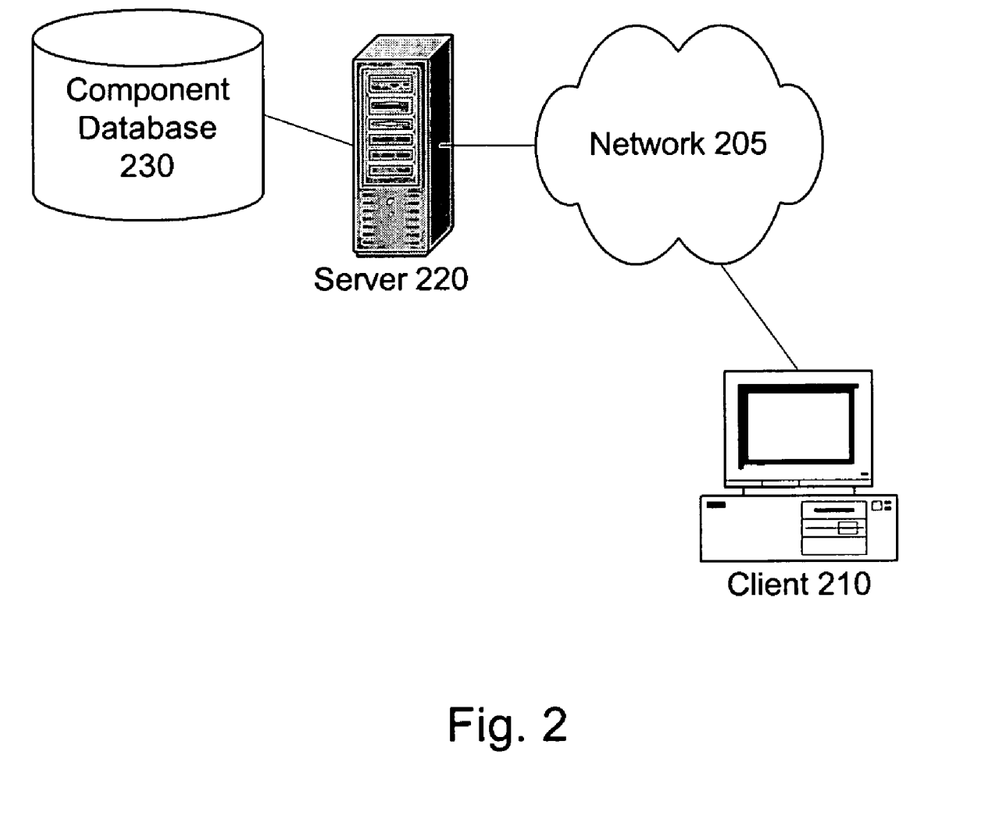
FIG. 2 shows an exemplary architecture of a server-client implementation, according to an aspect of the present disclosure.

For instance, FIG. 2 shows an exemplary architecture of a server-client implementation of the design comparative analysis, according to an embodiment of the present invention. FIG. 2 shows a client 210 in communication with a server 220 through a communications network 205 using known server-client communication techniques. The client 210 and the server 220 are computer systems, for example, as described above with respect to FIG. 1. The application software implementing the design comparative analysis process runs on the server 220 and may be accessible to multiple clients, including the client 210. However, in alternative embodiments, the application software (as well as the component database 230, discussed below) may reside on the client 210, e.g., an IBM compatible PC, without departing from the spirit and scope of the present disclosure. Likewise, in an embodiment of the present disclosure, the communications network 205 may be a packet switching network, such as the Internet. In alternative embodiments, the communications network 205 may include local networks, such as a corporate intranet or Ethernet, without departing from the spirit and scope of the present disclosure.

FIG. 2 also shows a component database 230 accessible to the server 220. The component database 230 contains information relating to network components available through different vendors or manufacturers. The information is stored in a manner enabling access through multiple forms of query. For example, the component database 230 stores information regarding each piece of network equipment in relation to the manufacturer's name, the equipment type, and the equipment capabilities and other attributes. Although depicted as a separate unit, in alternative embodiments, the database 230 can be internal to the server 220 or to the client 210 (when the client 210 executes the design comparative analysis application). Also, the component database 230 may include separate data bases, for example, each dedicated to a particular manufacturer or type of equipment, without departing from the spirit and scope of the present disclosure. For example, all or a portion of the component database 230 may be a database maintained by a particular vendor, which the design comparative analysis application contacts on an as needed basis to collect data and perform the design comparison. Likewise, all or a portion of the component database 230 may be maintained by a third party.

Figure 3:
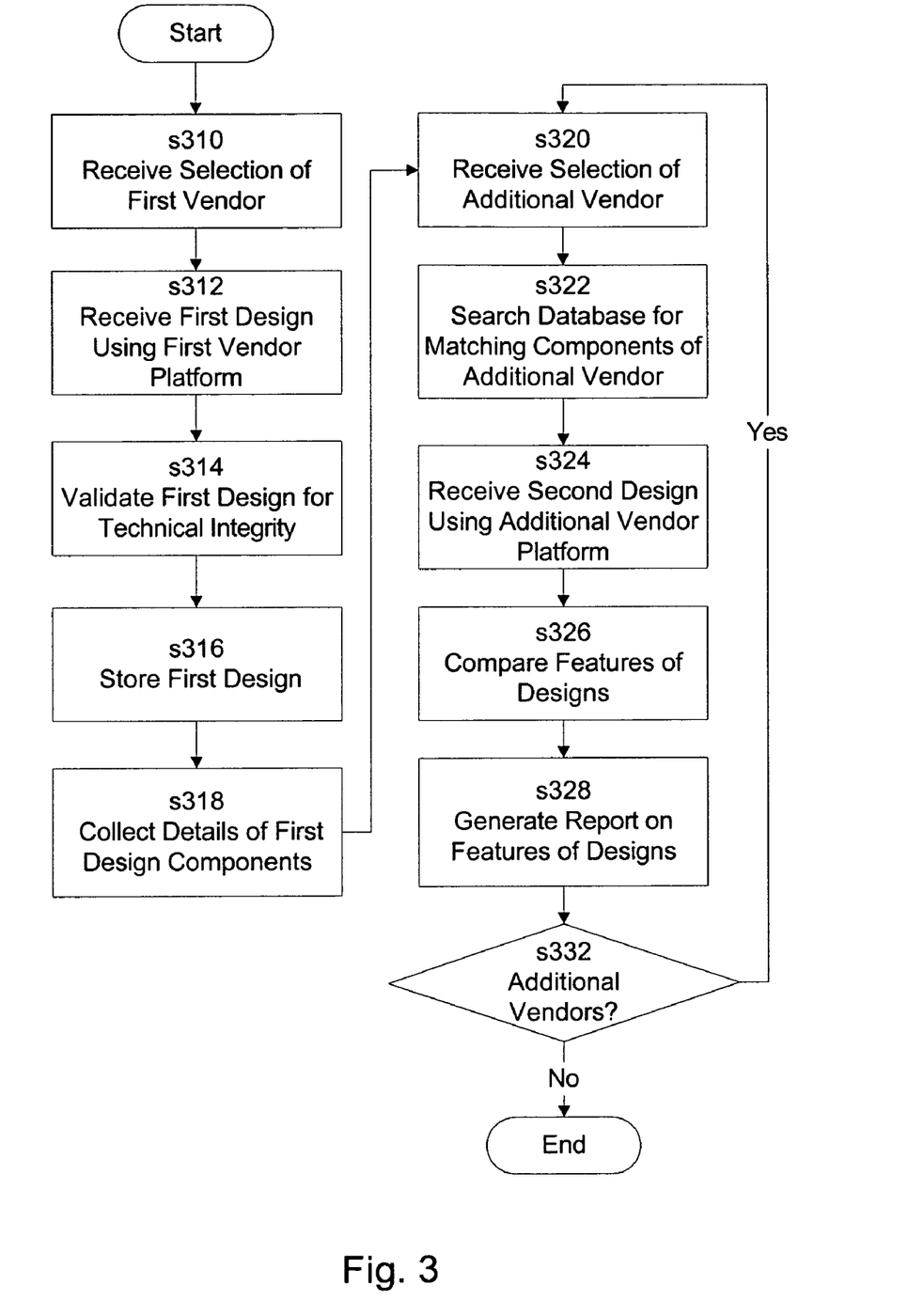
FIG. 3 shows an exemplary flowchart of the design comparative analysis process, according to an aspect of the present disclosure.

FIG. 3 is an exemplary flow diagram according to an aspect of the present disclosure, showing sample functionality of the design comparison analysis process, as implemented, for example, on the server 220 shown in FIG. 2. At step s310, selection of a first vendor is received, for example, in response to an inquiry to the client 210. The first vendor is a manufacturer or other provider of equipment to be used in developing the design. Often, an entire design is planned using a single vendor, such as Cisco Systems, Nortel Networks or Lucent Technologies, who produces several different types of network components. Alternatively, vendor identification may be made on a component-by-component basis as the engineer proceeds in the design process.

At step s312, a first design is received, for example, at the server 220. To the extent not provided in step s310, the design itself includes the identity of the various components, and can be extracted by the design comparative analysis application, as needed. In fact, in an embodiment, steps s310 and s312 can be combined into a single step. The design may be provided in a predetermined format compatible with the design comparison analysis application. For example, during the design process, the engineer may be required to enter information into defined data fields, so that the application can efficiently retrieve the necessary information. The design may include a variety of information fundamental to the proposed solution, such as equipment or component types and number, overall cost, suggested training requirements, maintenance requirements, support availability, timeframe for implementation, historical data (e.g., upgrades, patches, potential performance issues, operating system reloads, etc.), anticipated useful life, and the like. This information (as well as similar information relating to equipment from other manufactures) may be included in the component database 230.

In an embodiment, the first design may be validated at step s314, using any known validation tool or technique. For example, the design may be validated through integration with existing design tools, such as Netformx® DesignXpert®, available from Nefformx, Ltd. Alternatively, the design may be validated using an application provided by the selected vendor. For example, a design incorporating a particular vendor's equipment may be validated by submitting the design to the vendor's web cite (not pictured) over the Internet. The type and extent of validation does not affect the spirit or scope of the present disclosure. The validated first design is stored at step s316. The first design may be stored in any internal or external database, including the component database 230, accessible to the server 220.

At step s318, the relevant details of the first design are collected by the design comparative analysis application for comparison with competing designs. The details include information relevant to a comprehensive comparison between design, such as equipment or component types and numbers of each, overall cost, training and maintenance requirements, support availability, timeframe for implementation, historical data, anticipated useful life and the like. In an embodiment, these details may be collected and stored separately in anticipation of a comparative analysis with another design. However, the application may retrieve this data in the course of performing an actual comparison, although this would require collecting the information multiple times in the event that comparisons with multiple vendors or designs are performed.

At step s320, selection of another equipment vendor or platform is received, e.g., from the client 210. The database 230 is searched at step s322 in order to identify components of the second vendor that match or are otherwise comparable to the components of the first vendor used in the first design. In an embodiment, the design comparative analysis application automatically retrieves the comparable components from the database 230. The identification may be based on a number of matching criteria. For example, the application may retrieve or determine the attributes of the first vendor's equipment, and then search for matching attributes of the second vendor's equipment, including functionally, capability, capacity, cost, physical dimensions and the like. Alternatively, the application may generally identify a matching type of component (e.g., a switch or a router), and factor potential variations in attributes into the comparative analysis. The matching components may be provided to the engineer at the client 210 for confirmation, analysis and/or additional design efforts.

At step s324, a second design, incorporating the matching components of the additional vendor, is received by the design comparative analysis application, for example, at the server 220. The second design assures that any potential differences in the matching components are properly accounted for in a comparable network design. In an embodiment, the second design may likewise be validated for technical integrity (not pictured). Also, the second design may be generated automatically by the design comparative analysis application by aligning attributes of the matching components with those of the first design to accomplish the same overall network capability using the matching components.

The features of the first design and the second design are compared by the application at step s326, identifying or otherwise accentuating any differences that may exist. In an embodiment, the comparison is accomplished by analyzing the same attributes used in matching components. For example, differences between designs may be identified and quantified by comparing features such as port density, backplane speed, power consumption and the like. At step s328, the design comparative analysis application generates a report on the comparison and displays the report, for example, on the client 210. Of course, the report may be provided by any alternative means, such as email transmission, facsimile transmission, printer output and the like, enabling review of the results.

At step s332, the application queries whether there are additional vendors to be considered for the comparative analysis. If so, steps s320 through s332 are repeated. In alternative embodiments, the report of compared features is generated and provided to the engineer after all of the different designs using different vendor equipment have been compared, so that the entire comparative analysis appears in a single report. When it is determined at step s332 that no more vendors or alternative platforms are to be considered, the process ends.

Although FIG. 3 depicts a particular sequence of steps, it is understood that the sequence is exemplary to an embodiment, and is not intended to be limiting. For example, in alternative embodiments, the order of the steps may differ, or the various steps may occur simultaneously, without affecting the spirit and scope of the disclosure. Also, although depicted linearly, the various embodiments may be implemented through various programming techniques with appropriate arrangements.

Figure 4:
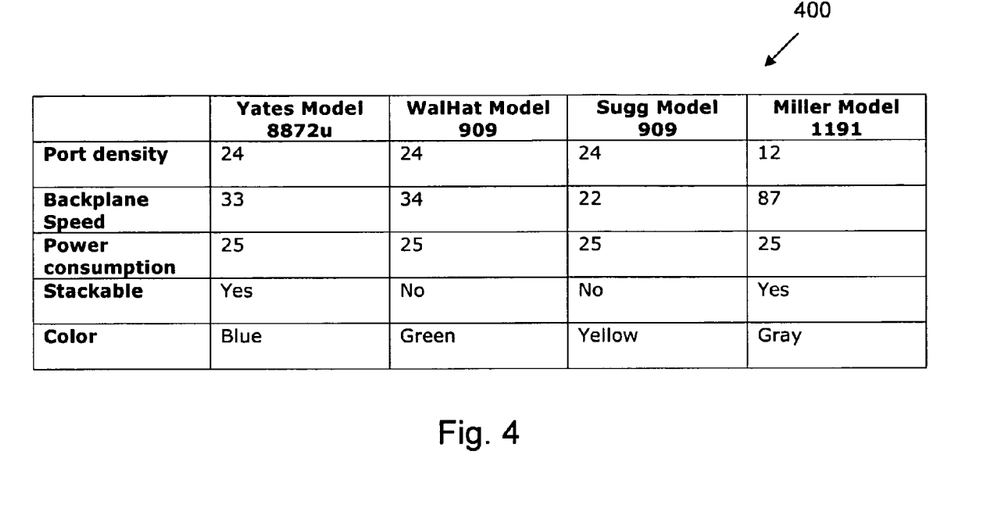
FIG. 4 shows an exemplary report generated by the design comparative analysis process, according to an aspect of the present disclosure.

FIG. 4 shows an exemplary component comparison report 400 that shows and compares characteristics of four versions of the same type of network component (i.e., a router) provided by four different fictitious vendors used in alternative designs. The component comparison report 400 compares a router selected for the first design (i.e., Yates Model 8872u) against comparable routers (i.e., WalHat Model 909, Sugg Model 909, Miller Model 1191), drawn from the component database 230, which share many of the same characteristics as the selected router. Any differences that exist between the respective features of these devices are readily identifiable and, in an embodiment, may be identified and separated into a separate report by the application. The exemplary component comparison report 400 shows side-by-side comparisons of port density, backplane speed, power consumption, whether the components are stackable, and the respective colors. In alternative embodiments, the characteristics to be included in the component comparison report 400 may be predetermined or selectable by the user at the client 210. As another alternative, such a report may include every feature in the component database 230 corresponding to the selected components. Also, in an embodiment, the report may contain graphics to visually accentuate the differences.

Figure 5:
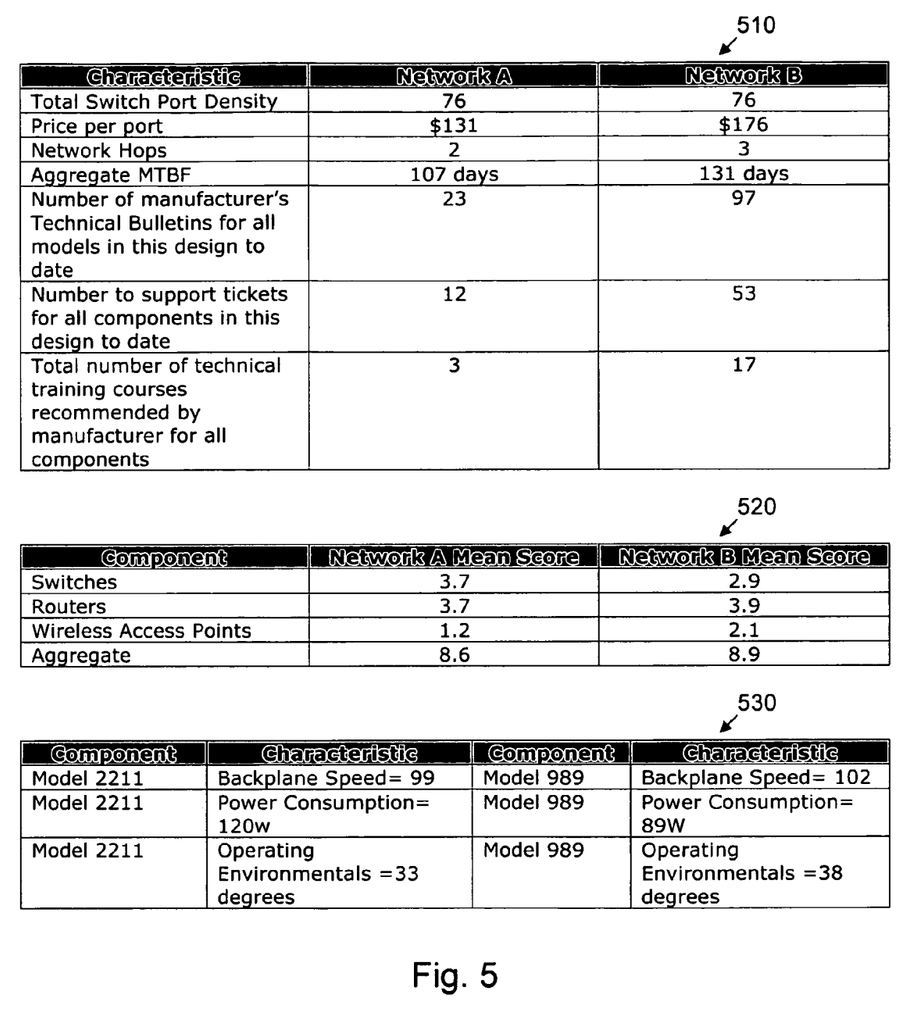
FIG. 5 shows another exemplary report generated by the design comparative analysis process, according to an aspect of the present disclosure.

FIG. 5 shows an exemplary a comprehensive design comparison report 500 that compares two designs, which enables a more holistic analysis. The design comparison report 500 enables a variety of desirable actions, as a practical matter. For example, an engineer may use the comparative design report to decide which vendor, equipment and/or equipment configuration to use in preparing a bid for a proposed network implementation. Also, the comparative design report 500 may be used to compare a competitor's design, thus clearly identifying relative strength and weaknesses. The report 500 may be presented to the potential customer for review as a selling tool, as well.

The exemplary design comparison report 500 includes three tables 510, 520 and 530, featuring different aspects of the competing designs, all of which may be retrieved and/or tabulated from the component database 230, as discussed above. Table 510 is a holistic overview of the two designs, identified in separate columns as Network A and Network B. The exemplary table 510 shows basic physical attributes of each design, such as the total switch port density (76 available ports on all switches for each design); the price per port ($131 for Network A and $176 for Network B); and the number of network hops (2 hops between subnets for Network A and 3 hops between subnets for Network B). The table 510 also shows support characteristics of the designs, such as aggregate mean time between failures (MTBF) (107 days for Network A and 131 days for Network B); number of manufacturer's technical bulletins in the design to date (23 for Network A and 97 for Network B); the number of support tickets for all components in the design to date (12 for Network A and 53 for Network B); and the total number of technical training courses recommended by the manufacturer for all components (3 for Network A and 17 for Network B).

Table 520 of the design comparison report 500 includes scoring information relating to the various physical components of the two designs. In this example, the table 520 provides mean scores for switches, routers and wireless access points, as well as an aggregate score for each network so that a direct comparison can be made. In an embodiment, the mean scores for each component (e.g., the switches) are derived from scores given to certain attributes of the components, which may be assigned automatically by the design comparative analysis application. For example, the attributes for a switch may include port density, backplane speed, power consumption, MTBF and the like, each of which is assigned a value from 0 to 5, for example. In an embodiment, the scores are based on weighted averages in order to account for various levels of importance associated with particular attributes and/or components.

The design comparative analysis application then determines a mean score from the assigned individual scores for the switch type and configuration in Network A and for the switch type and configuration in Network B. The attributes being scored may be predetermined and programmed into the design comparative analysis application, or the application may query the engineer at the client 210, for example, to select the attributes for each of the components to be scored and compared. The aggregate entry of table 520 is the sum of the mean scores for each component. In the depicted embodiment, the aggregate mean score for the Network A design is 8.6, while the aggregate mean score for the Network B design is 8.9, indicating that the design for Network B has a higher overall score (at least with respect to the listed components).

Table 530 of the design comparison report 500 includes a side-by-side comparison of specific component characteristics or attributes. In particular, table 530 compares the same three characteristics of fictitious switch model 2211 with those of fictitious switch model 989. As indicated in table 530, Model 2211 has a backplane speed of 99 MB/second, a power consumption of 120 watts, and operating environmentals of 33 degrees Fahrenheit. In direct comparison, Model 989 has a backplane speed of 102 MB/second, a power consumption of 89 watts, and operating environmentals of 38 degrees Fahrenheit. In an embodiment, each of these characteristics or attributes may be weighted according to relative importance and factored into the mean scores indicated in exemplary table 520, as discussed above.

Through use of the disclosed application, useful information can be automatically provided to a system engineer or network designer facing a competitive bid situation, for example, which would enable the engineer to gauge the overall considerations of the design. This provides a better understanding of the desirability of the proposed design, as well as the positioning of the proposed design against a competitor from a sales perspective. For example, in addition to enabling an engineer to efficiently develop designs based on multiple manufacturers' platforms for internal analysis, the design comparative analysis tool can assist in marketing a design based on using one manufacturer versus a competitor's design based on another manufacturer. Armed with this information, value could be added for any potential customer by reviewing shortcomings or trade-offs which may otherwise be realized after acceptance of a competitive design.

Integrating this function into existing design tools, such as Nefformx®, further enables an engineer or designer to not only perform a more thorough technical analysis of the better design from an objective standpoint, and can also be used to evaluate potential variances in cost and capabilities of designs with competitors, e.g., when the platform on which the competitor builds its design is known. For example, direct comparisons can be made in maintenance coverage, price and timelines, frequency with which competitive designs have historically required upgrades, patches or operating system reloads, potential performance issues, and anticipated replacement of specific components within the design due to end-of-life expectations (which may affect total cost of ownership).

Although the present specification describes components and functions that may be implemented in particular embodiments with reference to particular standards and protocols, the invention is not limited to such standards and protocols. Each of the standards, protocols and languages represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the spirit and scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments that fall within the true spirit and scope of the present disclosure. Thus, to the maximum extent allowed by law, the scope of the invention is to be determined by the broadest permissible interpretation of the following claims and their equivalents, and shall not be restricted or limited by the foregoing detailed description.

Although several exemplary embodiments have been described, it is understood that the words that have been used are words of description and illustration, rather than words of limitation. Changes may be made within the purview of the appended claims, as presently stated and as amended, without departing from the spirit and scope of the invention in its aspects. Although the description refers to particular means, materials and embodiments, the invention is not intended to be limited to the particulars disclosed, but rather extends to all functionally equivalent structures, methods, and uses such as are within the scope of the appended claims.

What is claimed is:

1. A non-transitory computer readable medium that stores a computer program for analyzing a plurality of network system designs, the computer program comprising:
   a first receiving code segment for receiving a first design comprising a plurality of first components, each of the first components having a plurality of attributes;
   an identifying code segment for accessing a component database and identifying a plurality of second components corresponding to the plurality of first components based on at least one attribute comparable to an attribute of the corresponding one of the first components, each of the second components having a plurality of attributes;
   a second receiving code segment for receiving a second design comprising the plurality of second components; and
   a comparing code segment for deriving a mean score for each of the first components and the second components from scores given to each of the attributes of the first components and the second components, and for generating an aggregate score for each of the first design and the second design, based on the mean scores of the first components and the second components,
   wherein the scores account for various levels of importance associated with particular attributes or components.

2. The computer readable medium according to claim 1, in which the plurality of first components are associated with a first vendor and the plurality of second components are associated with a second vendor.

3. The computer readable medium according to claim 2, in which the plurality of first components comprise at least one of a switch, a router and a network access point from the first vendor and the plurality of second components comprise at least one of a switch, a router and a network access point from the second vendor.

4. The computer readable medium according to claim 3, in which the identifying code segment identifies the plurality of second components based on matching an attribute of each of the first components with an attribute of the corresponding one of the second components.

5. The computer readable medium according to claim 1, further comprising:
   a reporting code segment for generating a report showing the aggregate scores of the first design and the second design.

6. A system for analyzing and selecting a network system design, the system comprising:
   a database comprising a plurality of components, each of the components being stored in association with data indicating a component type, a component provider and at least one component attribute; and
   a processor that receives a first design comprising a plurality of first components having a plurality of attributes, accesses the database to select a plurality of second components comparable to the first components based on at least one of component types of the second components, component providers of the second components, and specific attributes of the second components corresponding to specific attributes of the first components, derives a mean score for each of the first components and the second components from scores given to each of the attributes of the first components and the second components, and generates an aggregate score for each of the first design and a second design comprising the second components, based on the mean scores of the first components and the second components,
   wherein the scores account for various levels of importance associated with particular attributes or components.

7. The system according to claim 6, in which the processor is accessible to a plurality of clients over a data network, the processor receiving the first design from one of the plurality of clients.

8. The system according to claim 7, in which the processor is configured to receive an identification of a specific attribute of one of the second components and the corresponding specific attribute of one of the first components from the one of the plurality of clients.

9. A non-transitory computer readable medium that stores a computer program for analyzing a plurality of network system designs, the computer program comprising:
   a mean score generating code segment that generates a mean score for each of a plurality of components of a first network design, based on scores given to each of a plurality of attributes of each of the components of the first network design, and generates a mean score for each of a plurality of components of a second network design, based on scores given to each of a plurality of attributes of each of the components of the second network design;
   an aggregate score generating code segment that generates an aggregate score of the first network design, by aggregating the mean scores of the components of the first network design, and generates an aggregate score of the second network design, by aggregating the mean scores of the components of the second network design; and
   a report generating code segment that generates a design comparison report comparing the aggregate scores of the first and second network designs,
   wherein the scores account for various levels of importance associated with particular attributes or components.

10. The computer readable medium according to claim 9, wherein the design comparison report compares each of the mean scores of the components of the first network design with a mean score of a corresponding component of the second network design.

11. The computer readable medium according to claim 9, further comprising a score assigning code segment that automatically assigns the score of at least one attribute of at least one of the components of the first and second network designs.

12. The computer readable medium according to claim 9, wherein the attributes comprise at least one of port density, backplane speed, power consumption, and MTBF.

13. The computer readable medium according to claim 9, wherein the scores are based on weighted averages.

* * * * *